United States Patent [19]
Cohen et al.

[11] Patent Number: 5,287,435
[45] Date of Patent: Feb. 15, 1994

[54] THREE DIMENSIONAL MODELING

[75] Inventors: Nissan Cohen, Kiryat Nordau; Gill Barequet, Herzlia; Daniel Barnea, Tel Baruch; Barry Ben-Ezra, Ramat Hasharon; Yehoshua Dollberg, Ra'anana; Shalev Gilad, Hod Hasharon; Varda Herskowits, Petach Tikva; Herbert Meininger, Ramat Hasharon; Itzik Pomerantz, Kfar Saba; Benjamin Sas, Rehovot; Yehoshua Sheinman, Tel Aviv; Mark Shlick, Kiryat Ono; Michael Wasserstein, Tel Aviv; Nachshon Yeshurun, Mobile Post Shomron, all of Israel

[73] Assignee: Cubital Ltd., Herzlia, Israel

[21] Appl. No.: 572,214

[22] Filed: Aug. 23, 1990

Related U.S. Application Data

[63] Continuation-in-part of Ser. No. 57,366, Jun. 19, 1987, Pat. No. 4,961,154, and Ser. No. 290,318, Dec. 22, 1988, Pat. No. 5,031,120.

[30] Foreign Application Priority Data

Jul. 10, 1990 [IL] Israel ......................................... 95034

[51] Int. Cl.⁵ ..................... G06F 15/00; G06K 9/00; B28B 17/00
[52] U.S. Cl. .................... 395/118; 364/468; 364/472; 264/22; 264/183; 425/162
[58] Field of Search .............. 364/518, 521, 468, 472; 340/747, 750; 395/133, 118; 264/22, 183; 425/162

[56] References Cited

U.S. PATENT DOCUMENTS

| | | | |
|---|---|---|---|
| 3,428,503 | 2/1969 | Beckerle | 156/11 |
| 4,404,684 | 9/1983 | Takada | 382/25 |
| 4,575,330 | 3/1986 | Hull | 425/174.1 |

FOREIGN PATENT DOCUMENTS

| | | |
|---|---|---|
| 0168179 | 1/1986 | European Pat. Off. |
| 0171069 | 1/1986 | European Pat. Off. |
| 0250121 | 2/1987 | European Pat. Off. |
| 0322257 | 6/1989 | European Pat. Off. |
| 0388129 | 9/1990 | European Pat. Off. |
| 1797599 | 8/1974 | Fed. Rep. of Germany |
| 2567668 | 1/1986 | France |
| 243646 | 4/1947 | Switzerland |
| 1243044 | 8/1971 | United Kingdom |
| 1472978 | 5/1977 | United Kingdom |
| 1582199 | 12/1980 | United Kingdom |
| 8101474 | 11/1980 | World Int. Prop. O. |
| 8909687 | 10/1989 | World Int. Prop. O. |

OTHER PUBLICATIONS

Graphic Input Devices for CAD/CAM by Thomas A. Nobbe Machine Design, Feb. 21, 1985, pp. 109–111.
V. D. McGinnis, Org. Coatings Appl. Polym. Sci., 48, 231–234, (Mar. 1983).
U. G. Kloosterber et al, Polym Preprints, 26 [2] 351, 352 (Sep. 1985).
J. of Appl. Photographic Engineering, vol. 8, No. 4, Aug. 1982, pp. 185–188, A. J. Herbert-Solid Object Generation.
Chemical Abstracts, vol. 91, No. 24, Dec. 1979, pp. 609, A. Aviram.
Hideo Kodama-Automatic Method for Fabricating 1 3-Dimensional Plastic Model with Photo-Hardening Polymer, Rev. Sci. Instrum., 52(11), No. 1981, pp. 1770–1773.
John K. Krouse-High Technology, Engineering without Paper, Mar. 1986, pp. 38–46.
Catalog of Fischer Educational Materials, Springfield, N.J. USA, Item S65466. Jun. 1987.

Primary Examiner—Phu K. Nguyen
Attorney, Agent, or Firm—Abelman Frayne & Schwab

[57] ABSTRACT

Apparatus for producing a three-dimensional model including apparatus for depositing, layer upon layer, a photopolymer material in a selectable configuration and apparatus for curing each photopolymer layer following deposition thereof and prior to deposition thereon of a succeeding layer of photopolymer.

30 Claims, 12 Drawing Sheets

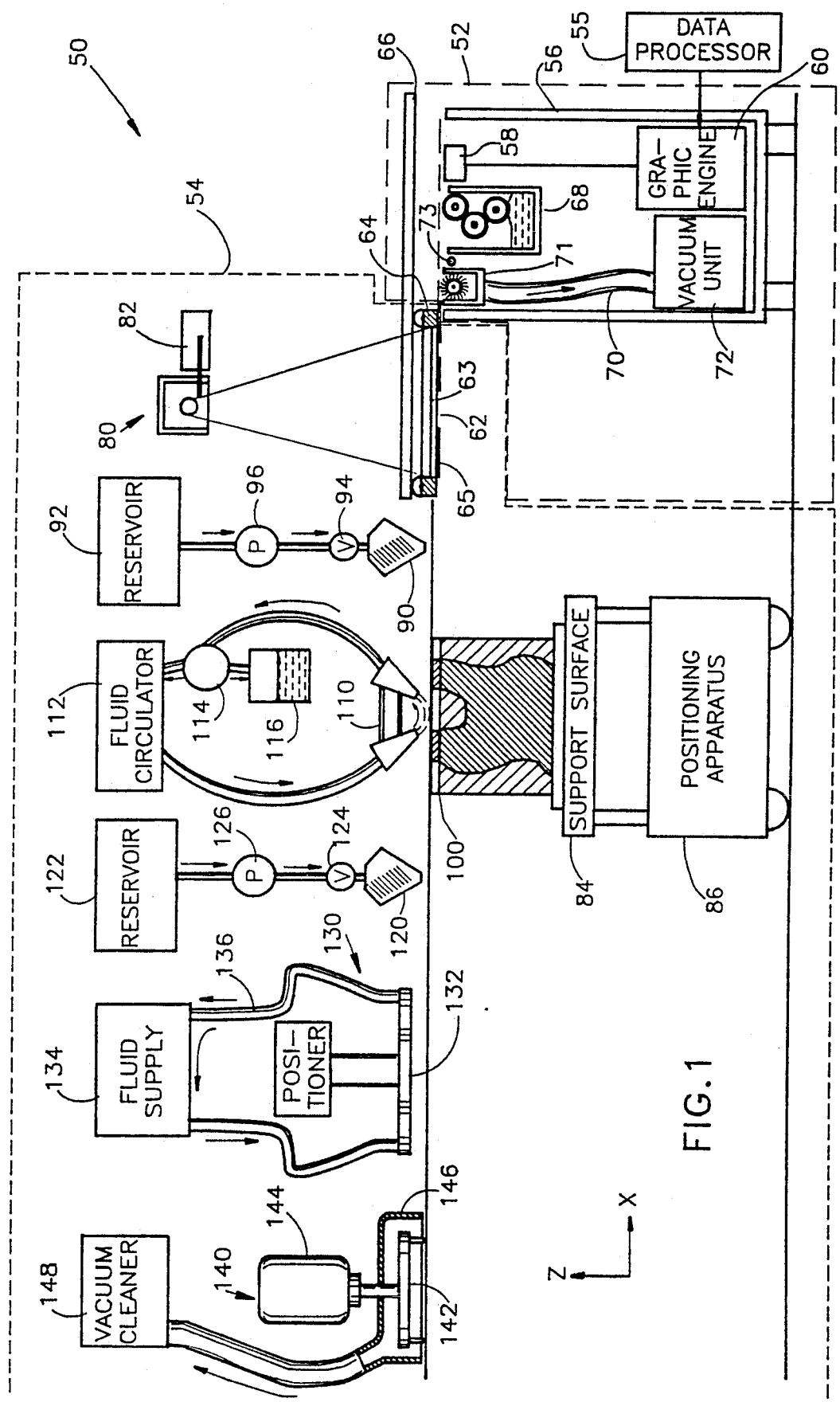

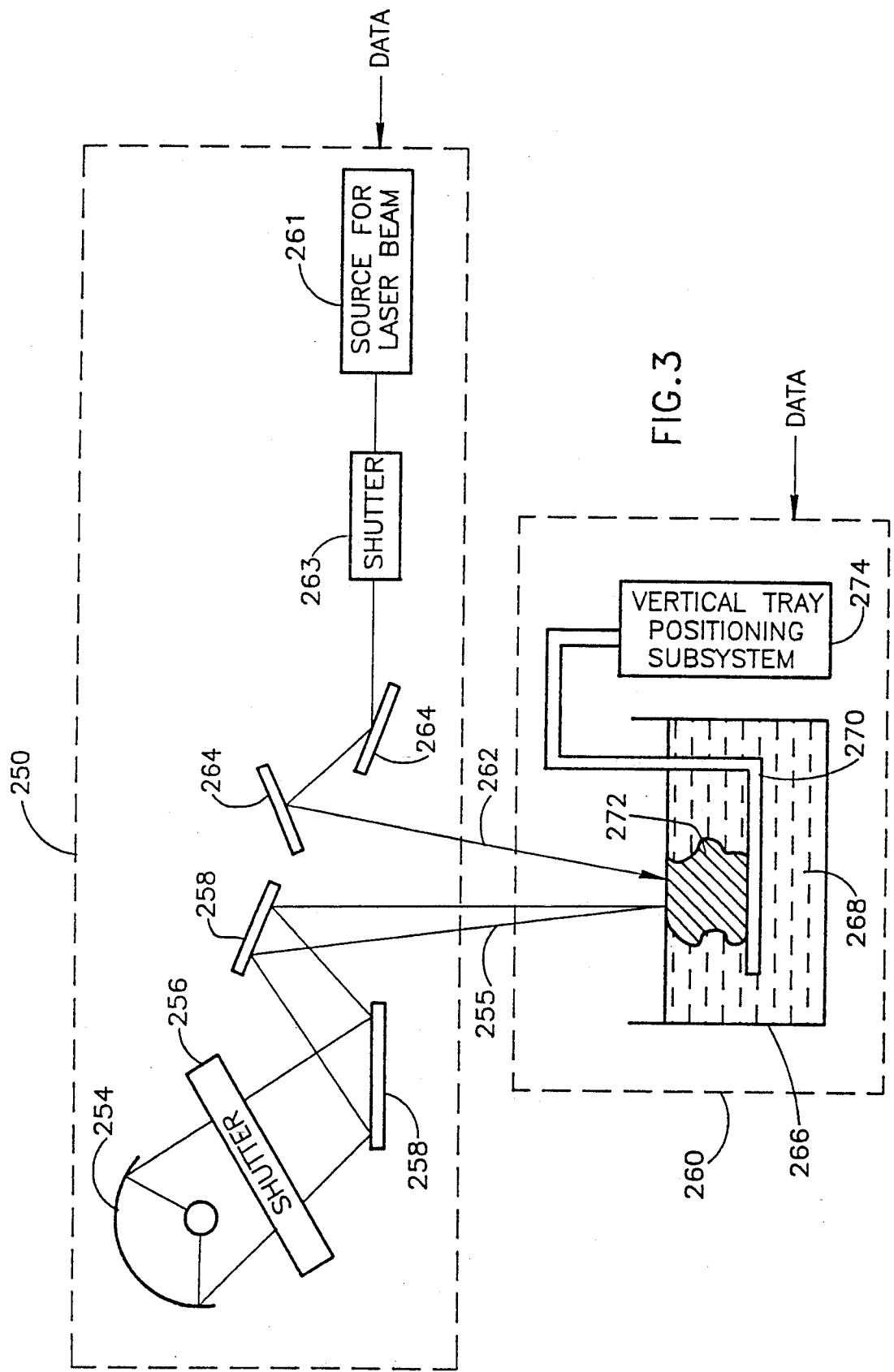

LAYER TO BE HARDENED

THREE DIMENSIONAL MODELING

REFERENCE TO RELATED APPLICATIONS

This is a continuation-in-part of U.S. patent application Ser. No. 057,366, filed Jun. 2, 1987, now U.S. Pat. No. 4,961,154, and U.S. patent application Ser. No. 290,318, filed Dec. 22, 1988, now U.S. Pat. 5,031,120.

FIELD OF THE INVENTION

The present invention relates to three dimensional modeling generally.

BACKGROUND OF THE INVENTION

Various systems for three dimensional modeling have been proposed. There is described in U.S. Pat. No. 4,575,330 to Hull, apparatus for production of three-dimensional objects by stereolithography. The system described therein is intended to produce a three-dimensional object from a fluid medium capable of solidification when subjected to prescribed synergistic stimulation and comprises apparatus for drawing upon and forming successive cross-sectional laminae of the object at a two-dimensional interface and apparatus for moving the cross-sections as they are formed and building up the object in step wise fashion, whereby a three-dimensional object is extracted from a substantially two-dimensional surface.

An earlier publication by Hideo Kodama entitled "Automatic method for fabricating a three-dimensional plastic model with photo-hardening polymer", Rev. Sci. Instrum. 52(11) November, 1981, pp. 1770–1773 describes many of the features appearing in the Hull Patent as well as additional features.

An article by Alan J. Herbert entitled "Solid Object Generation" in Journal of Applied Photographic Engineering 8: 185 188 (1982) describes the design of apparatus for producing a replica of a solid object using a photopolymer.

FIG. 5 of the Hull Patent and FIGS. 1A and 1B of the Kodama article illustrate layer by layer buildup of a model through radiation applied to a solidifiable liquid through a mask using a "contact print" technique. Accordingly, the pattern mask for each layer must be in a 1:1 scale relationship with the object to be generated and must be located extremely close to it.

A number of difficulties are involved in the use of a contact print technique due to the required 1:1 scale. If a complex object having a typical size of up to 10 inches on each side is contemplated and resolution of 100 microns is desired, approximately 2500 masks will be required, covering an area of over 150 sq. meters. An extremely fast mechanism for moving and positioning the masks and the use of non-standard film of a given size for a given scale output would be required.

The required proximity of the mask to the object in contact print exposure is not believed to be desirable in an industrial environment because of anticipated contact between the mask and the solidifiable liquid due to vibrations in the liquid during positioning and movement of the masks and due to spurious impacts.

Neither Kodama nor Hull provides apparatus for accurate positioning of the mask and accurate registration of masks for different layers. The positioning error must not exceed the desired resolution, typically 100 microns.

Both Kodama and the Hull patent employ an arrangement whereby the object is built up onto a base which lies in a container of solidifiable liquid and moves with respect thereto. Such an arrangement involves placing a base displacement mechanism in the container and in contact with the solidifiable liquid. Due to the high viscosity and glue-like nature of such liquids, it is believed to be impractical to operate such a system when it is desired to change materials in order to vary the mechanical properties or color of the object being generated. Neither Hull nor Kodama are suitable for use with highly viscous liquids.

Furthermore, should excessive radiation be applied to the liquid, the entire volume might solidify, thus encasing the support mechanism therein.

Definition of the bottom limit of solidification for a given layer is achieved in the Hull and Kodama references by precise control of irradiation energy levels. Due to the fact that energy intensity decreases exponentially with depth within the liquid, this technique does not provide a sharp definition in layer thickness, as noted by Hull on pages 9 and 10, referring to FIG. 4. Hull suggests solving the problem of bottom limit definition by using an upwardly facing radiation technique which is not applicable to many geometrical configurations.

The prior art exemplified by the Kodama and Hull references does not provide teaching of how to model various geometries which involve difficulties, for example a closed internal cavity, such as a hollow ball, isolated parts, such as a linked chain, and vertically concave shapes, such as a simple water tap. The identification of situations which require the generation of support structures and the automatic generation of such structures are not suggested or obvious from the prior art. Neither Kodama nor Hull contain suggestions for maximizing utilization of the available model generation volume.

An additional difficulty involved in prior art modeling techniques of the type exemplified by the Kodama and Hull references, but which is not explicitly considered by either is shrinkage of the solidifiable liquid during solidification. Normal shrinkage for most of the available resins employed in the prior art is about 8% in volume and 2% in each linear dimension. This shrinkage can affect the dimensional accuracy of the three dimensional model in the following principal ways: two-dimensional linear scale changes, two-dimensional non-linear distortions due to internal stresses with each individual layer as it solidifies and three-dimensional distortions due to stresses arising from stresses in the overall model during a final curing step.

The Hull technique suggests the use of direct laser writing in a vector mode, which requires extreme uniform writing speed in order to maintain a constant energy level and produce a uniform layer thickness and extremely sensitive resins.

In U.S. patent application Ser. No. 057,366 of the present assignee, which is incorporated herein by reference, there is described a method for the production of 3-dimensional models by means of a system for automatically providing a three-dimensional physical model of a desired geometry including apparatus for selectably solidifying a solidifiable material on a sequential layer by layer basis.

In U.S. patent application Ser. No. 290,318 also of the present assignee, there is described a system for automatically providing a three-dimensional physical model of a desired geometry which includes apparatus for sequentially irradiating a plurality of layers of a solidifiable material via masks produced in accordance with received coordinate information. The apparatus includes a reusable substrate and apparatus for depositing toner on the reusable substrate in patterns.

SUMMARY OF THE INVENTION

The present invention seeks to provide improved apparatus and techniques for three-dimensional modeling.

There is thus provided in accordance with a preferred embodiment of the present invention, apparatus for producing a three-dimensional model including apparatus for depositing, layer upon layer, a photopolymer material in a selectable configuration and apparatus for curing each photopolymer layer following deposition thereof and prior to deposition thereon of a succeeding layer of photopolymer.

Preferably, there is provided apparatus for applying a support material at certain locations of each layer which are not filled by photopolymer prior to deposition onto said layer of a succeeding layer of photopolymer.

There is also preferably provided machining apparatus for leveling each layer prior to deposition thereon of a succeeding layer of photopolymer.

Additionally in accordance with a preferred embodiment of the invention there is provided a method for producing a three-dimensional model including the steps of:

depositing, layer upon layer, a photopolymer material in a selectable configuration; and curing each photopolymer layer following deposition thereof and prior to deposition thereon of a succeeding layer of photopolymer.

Preferably the method also includes the step of:

applying a support material at certain locations of each layer which are not filled by photopolymer prior to deposition onto said layer of a succeeding layer of photopolymer.

The method also preferably includes the step of:

leveling each layer prior to deposition thereon of a succeeding layer of photopolymer.

In accordance with an alternative embodiment of the invention there is provided apparatus for producing a three-dimensional model including apparatus for depositing, layer upon layer, a photopolymer material and apparatus for image-wise curing each photopolymer layer following deposition thereof and prior to deposition thereon of a succeeding layer of photopolymer, wherein the apparatus for curing includes apparatus for initially curing the layer at interior locations of images and subsequently curing the layer at peripheral locations of images.

In this embodiment, the apparatus for initially curing preferably includes apparatus for applying a relatively coarse, relatively high power beam of ultraviolet illumination at regions away from edges of the image and apparatus for subsequently applying a relatively well focussed, relatively low power beam of laser radiation to regions of the layer adjacent the edges.

In accordance with this embodiment of the invention, there is provided a method for producing a three-dimensional model comprising the steps of:

depositing, layer upon layer, a photopolymer material; and curing each photopolymer layer following deposition thereof and prior to deposition thereon of a succeeding layer of photopolymer, and wherein the step of curing includes the steps of initially curing the layer at interior locations thereof and subsequently curing the layer at exterior locations thereof.

In the foregoing method, preferably the step of initially curing includes the steps of:

applying a relatively coarse, relatively high power beam of ultraviolet illumination at regions away from edges of the layer; and subsequently applying a relatively well focussed, relatively low power beam of laser radiation to regions of the layer adjacent the edges.

In accordance with an alternative embodiment of the invention, there is provided apparatus for producing a three-dimensional model including apparatus for depositing, layer upon layer, a photopolymer material, apparatus for curing each photopolymer layer following deposition thereof by exposing each layer of the photopolymer material through a mask defining a layered section of an object to be modeled superimposed upon a grid pattern, and wherein the apparatus for curing includes:

computer apparatus for generating a layer by layer raster pattern parallel to a first axis of each layer; and hardware plotter driver apparatus receiving the raster pattern and decoding it to define first grid lines along the first axis and adding thereto second grid lines along a second axis, thereby to define the grid pattern.

In one embodiment of the invention, the grid lines are defined only within the object to be modeled. Alternatively the grid lines may extend also outside the object.

There is also provided a method for producing a three-dimensional model comprising the steps of:

depositing, layer upon layer, a photopolymer material, curing each photopolymer layer following deposition thereof by exposing each layer of the photopolymer material through a mask defining a layered section of an object to be modeled superimposed upon grid pattern, and wherein the step of curing includes the steps of:

computer generating a layer by layer raster pattern parallel to a first axis of each layer; and receiving the raster pattern and decoding it to define first grid lines along the first axis and adding thereto second grid lines along a second axis, thereby to define the grid pattern.

Additionally in accordance with an alternative embodiment of the invention, there is provided apparatus for producing a three-dimensional model including apparatus for depositing, layer upon layer, a photopolymer material, and also including apparatus for exposing the photopolymer material to define selectable configuration and apparatus for curing the exposed portion of each photopolymer layer following deposition thereof and prior to deposition thereon of a succeeding layer of photopolymer, wherein the apparatus for exposing includes an apparatus for directing illumination through a mask including a relatively low resolution, programmable erasable portion associated with a relatively high resolution non-erasable film portion.

In accordance with this embodiment of the invention, there is provided a method for producing a three-dimensional model comprising the steps of:

depositing, layer upon layer, a photopolymer material;

exposing the photopolymer material to define selectable configuration; and curing the exposed portion of each photopolymer layer following deposition thereof and prior to deposition thereon of a succeeding layer of photopolymer, and wherein the step of exposing comprises the step of directing illumination through a mask including a relatively low resolution, programmable erasable portion associated with a relatively high resolution nonerasable film portion.

In accordance with an alternative embodiment of the invention, there is provided apparatus for removing toner from a surface including a rotatable cleaning blade having a first operative orientation in engagement with a surface to be cleaned and a second operative orientation for being cleaned, and a blade cleaning brush operatively engaging said cleaning blade when it is in its second operative orientation.

A further embodiment of the invention provides powder toner development apparatus including at least one roller arranged to pick up powder toner, doctor blade apparatus arranged in near touching arrangement with the at least one roller along an elongate engagement location and lying in a plane which defines an acute angle with the upstream tangent of the roller at the engagement location.

In the foregoing embodiment, preferably, the doctor blade apparatus is resilient and applies a positive force to toner on at least one roller at elongate engagement location.

Preferably, the roller comprises at least the first and the second rollers, wherein the first roller supplies toner to the second roller and the doctor blade apparatus comprises first and second doctor blades in operative engagement with first and second rollers and respective first and second elongate engagement locations and wherein first doctor blade lies closer to said first roller at first engagement location than second doctor blade lies with respect to second roller at second engagement location and wherein the second roller has a surface velocity slower than the surface velocity of the first roller.

Additionally, according to an alternative embodiment of the present invention, there is a cleaning unit for removing toner from a surface including a cleaning brush, a magnetic roller arranged to remove toner from the cleaning brush, and a scraper blade which is magnetically urged against the magnetic roller for removing toner from the magnetic roller.

Provided by a further embodiment of the present invention is an apparatus for producing a three-dimensional model including apparatus for depositing, layer upon layer, a photopolymer material, and apparatus for curing each photopolymer layer following deposition thereof and prior to deposition thereon of a succeeding layer of photopolymer, and wherein the apparatus for depositing includes apparatus for selectably forming a diagnostic layer and also comprising apparatus for analyzing the diagnostic layer, and apparatus for removing the diagnostic layer before subsequent deposition of other layers.

In accordance with this embodiment of the invention there is provided a method for producing a three-dimensional model comprising the steps of:

depositing, layer upon layer, a photopolymer material;

curing each photopolymer layer following deposition thereof and prior to deposition thereon of a succeeding layer of photopolymer, and wherein the step of depositing includes the step of selectably forming a diagnostic layer, and wherein the method also comprises the steps of: analyzing the diagnostic layer; and removing the diagnostic layer before subsequent deposition of other layers.

An additional embodiment of the invention provides apparatus for producing a three-dimensional model including apparatus for depositing, layer upon layer, a photopolymer material, and apparatus for curing each photopolymer layer following deposition thereof and prior to deposition thereon of a succeeding layer of photopolymer; and optical inspection means for visually inspecting each layer as it is formed.

According to this embodiment, there is preferably provided apparatus for exposing the photopolymer material through a mask to define selectable configuration and wherein the optical inspection apparatus includes apparatus for inspecting the mask.

Additionally, there is provided a method for producing a three-dimensional model comprising the following steps:

depositing, layer upon layer, a photopolymer material;

curing each photopolymer layer following deposition thereof and prior to deposition thereon of a succeeding layer of photopolymer; and optically inspecting each layer as it is formed.

Preferably, this method also comprises the step of:

exposing the photopolymer material through a mask to define selectable configuration and wherein the optical inspection step comprises inspecting the mask.

In accordance with a further embodiment of the present invention, there is provided apparatus for producing a three-dimensional model including apparatus for depositing, layer upon layer, a photopolymer material, and apparatus for curing each photopolymer layer following deposition thereof and prior to deposition thereon of a succeeding layer of photopolymer, wherein the apparatus for curing includes apparatus for initially partially curing the photopolymer layer to provide a partially cured photopolymer layer and apparatus for removing the uncured liquid from the partially cured photopolymer layer, and apparatus for thereafter finally curing the photopolymer layer.

There is also provided a method for producing a three-dimensional model comprising the steps of:

depositing, layer upon layer, a photopolymer material;

curing each photopolymer layer following deposition thereof and prior to deposition thereon of a succeeding layer of photopolymer, and wherein the step of curing includes the steps of: initially partially curing the photopolymer layer to provide a partially cured photopolymer layer; removing the uncured liquid from the partially cured photopolymer layer and thereafter finally curing the photopolymer layer.

Additionally, there is provided in a further embodiment of the present invention apparatus for producing a three-dimensional model including apparatus for depositing, layer upon layer, a photopolymer material; and apparatus for curing each photopolymer layer following deposition thereof and prior to deposition thereon of a succeeding layer of photopolymer; and apparatus for providing a visually sensible indication on each layer.

Additionally, in accordance with this embodiment of the invention there is provided a method for producing a three-dimensional model comprising the steps of:

depositing, layer upon layer, a photopolymer material;

curing each photopolymer layer following deposition thereof and prior to deposition thereon of a succeeding layer of photopolymer; and providing a visually sensible indication on each layer.

In addition, an alternative embodiment of the invention provides a linear encoder including a threaded shaft arranged so as to rotate and cause a linear displacement of an object along a linear trajectory whose linear displacement is to be monitored, a rotary encoder associated with the threaded shaft for providing a first output indication of the linear displacement of the object by measuring rotation of the threaded shaft, and a linear encoder [whose travel is significantly shorter than the linear trajectory] operative to be engaged in a selected portion of the linear trajectory and independently measure the distance between the object and a reference location, thereby providing a second output indication of the linear displacement of the object.

Further, there is an additional embodiment of the invention which provides apparatus for producing a three-dimensional model including apparatus for depositing, layer upon layer, a photopolymer material, apparatus for curing each photopolymer layer following deposition thereof and prior to deposition thereon of a succeeding layer of photopolymer, apparatus for applying a support material at certain locations of each layer which are not filled by photopolymer prior to deposition onto the layer of a succeeding layer of photopolymer, wherein the support material is a solidifiable material and apparatus arranged for planar engagement with the layer after application of the support material, for cooling and thus solidifying the solidifiable material.

Preferably, the solidifying plate apparatus includes an outer, inactive contact plate portion having a relatively low thermal inertia and an inner, active plate portion having a relatively high thermal inertia.

Additionally, there is provided in accordance with a further embodiment of the present invention, apparatus for producing a three-dimensional model including means for depositing, layer upon layer, a photopolymer material, apparatus for curing each photopolymer layer following deposition thereof and prior to deposition thereon of a succeeding layer of photopolymer, apparatus for applying a support material at certain locations of each layer which are not filled by photopolymer prior to deposition onto the layer of a succeeding layer of photopolymer, wherein the support material is a sintered powder.

BRIEF DESCRIPTION OF THE DRAWINGS

The present invention will be understood and appreciated more fully from the following detailed description, taken in conjunction with the drawings in which:

FIG. 1 is a generalized block diagram illustration of a system for three-dimensional modeling constructed and operative in accordance with a preferred embodiment of the present invention;

FIG. 3 is a generalized illustration of part of the system of FIG. 1 in accordance with another preferred embodiment of the invention;

DETAILED DESCRIPTION OF PREFERRED EMBODIMENTS

Figure 9:
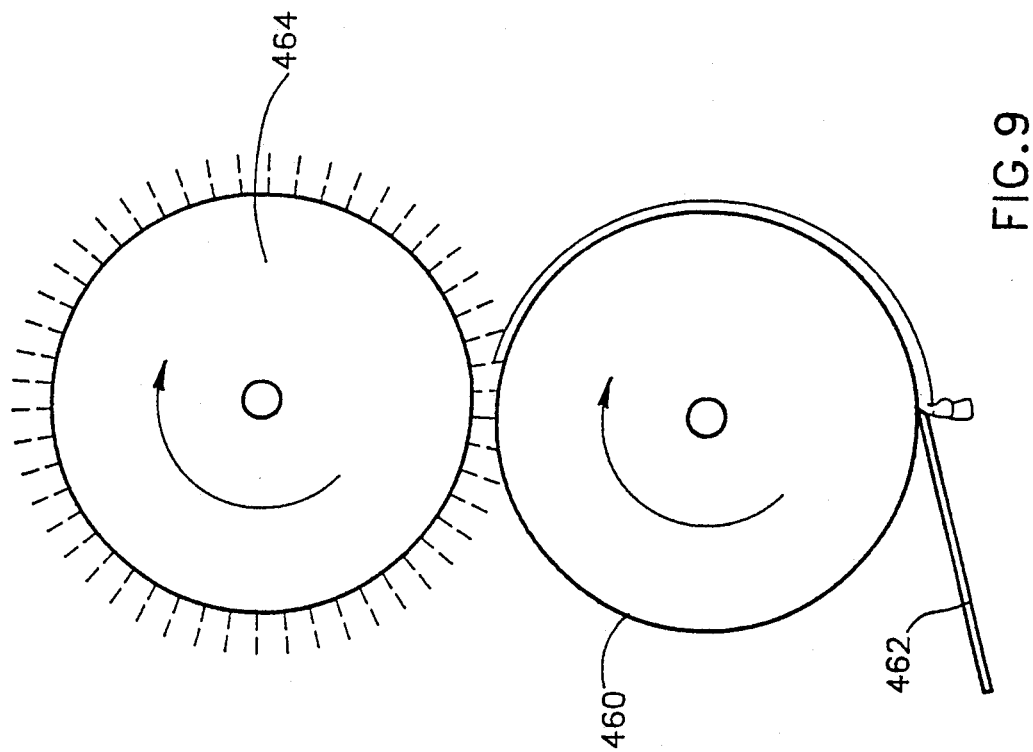
FIG. 9 is an illustration of a portion of a cleaning station forming part of the apparatus of FIG. 5.

Reference is now made to FIG. 1, which illustrates in generalized form a preferred embodiment of apparatus according to the present invention for producing three dimensional physical models. FIG. 1 shows a system 50 for producing three dimensional physical models which includes two basic subsystems, a mask producing subsystem 52 receiving data, such as a CAD file, from an external data source (not shown), and a physical model producing subsystem 54. The data may be pre-processed by a data processing subsystem 55.

The mask producing subsystem 52 preferably comprises ionographic imaging apparatus 56, including an ionographic writing head 58, such as a writing cartridge incorporated in a model 2460 graphic engine found in a model S6000 printer, commercially available from Delphax Systems Corp. of Toronto, Canada.

Writing head 58 comprises an array of ion guns which produces a stream of ions in response to received control currents which are provided by a graphic engine 60, such as the 2460 graphic engine mentioned above. Graphic engine 60 is operative to convert graphic data received in a conventional graphic format to the control currents.

Writing head 58 writes onto a transparent dielectric surface 62 which coats a transparent conductive surface which is formed on the underside of a transparent substrate 63, typically formed of glass. The substrate 63 is typically supported on a carriage 64 which travels along a linear guide 66 transversely to writing head 58, which remains stationary. The conductive surface and the dielectric surface are preferably embodied in a commercially available film sold by Hanita Coatings of Hanita, Israel, and designated by Model No. HA 01215.

After ion deposition at writing head 58, the substrate 63 moves into operative engagement with a developing unit 68, such as the developing unit incorporated as part of the aforementioned Model 2460 graphic engine. The developing unit 68 is operative to deposit toner onto the ionized portions of the substrate 63, thereby generating a mask 65.

The mask producing subsystem 52 also comprises substrate cleaning and toner removal apparatus 70 which removes the mask from the substrate after use. Apparatus 70 may include a brushing unit 71 and a vacuum unit 72. A corona discharge device 73 electrically discharges the substrate after toner removal. Alternatively, the toner may be removed magnetically even by a roller employed as part of the developing unit 68.

Following the developing of the latent ionographic image on the substrate 63, the substrate 63 leaves the mask producing subsystem 52 and is transported to the physical model producing subsystem 54.

In the physical model producing subsystem 54, the mask bearing substrate is precisely positioned in operative engagement with an exposure unit 80, typically comprising a Model AEL1B UV light source, available from Fusion UV Curing Systems of Rockville, Md. U.S.A. A mechanical shutter 82 controls the exposure.

The three dimensional model is built up layer by layer on a model support surface 84 which can be selectably positioned along the X and Z axes by suitable conventional positioning apparatus 86. Initially the model support surface 84 is located in operative engagement with and under a resin applicator 90, such as a device identified by Part No. PN-650716 found in SNAH 88 of Nordson Corporation, Atlanta, Ga.

Applicator 90 receives a supply of radiation solidifiable material such as Desolite Y112-173-1 from Desoto, Inc. of Des Plaines, Ill., USA, or alternately, BD013/5 from Coates Brothers PLC, London, England, from a reservoir 92 via a valve 94 and a supply pump 96 and is operative to provide a layer 100 of radiation solidifiable material onto support surface 84 which layer is of generally uniform thickness, typically 0.15 mm. Following application of a radiation solidifiable layer thereto, the surface 84 is positioned in operative engagement with, and under exposure unit 80, such that the mask formed on substrate 63 lies intermediate the light source and the layer 100 in proximity to layer 100 for proximity exposure.

The shutter 82 is opened for an appropriate duration, typically 5 seconds, thus permitting exposure of the layer 100 through the mask 65 and consequent hardening of the exposed regions of the layer 100. The shutter is then closed.

The mask 65 together with its substrate 63 is returned to the mask producing subsystem 52 for cleaning and preparation of a subsequent mask.

In order to eliminate possible defects in the structure of the model due to inherent defects in the transmissivity of the substrate, such as the presence of air bubbles, cracks and scratches therein, the orientation of the substrate with respect to the ionographic imaging apparatus may be randomly varied for subsequent layers by changing the relative position of the latent image 65 on the substrate 63 and precisely compensating for such variations at the exposure unit 80, in order to preserve the registration of the layers of the model. Accordingly, the resulting defects do not occur at the same location in each subsequent layer and thus their effect is negligible.

While a subsequent mask is being produced, the model generation process continues: the exposed layer 100 is positioned in operative engagement with a fluid strip generator 110 for removal of unhardened radiation solidifiable material from layer 100, as described in our copending U.S. patent application Ser. No. 290,318, the disclosure of which is hereby incorporated by reference.

The generator 110 communicates with a "push-pull" fluid circulator 112, which may comprise one or more pumps to provide desired positive and negative pressures. Generator 110 also communicates with a separator 114 which separates non-solidified solidifiable material from the fluid stream and directs it to a reclamation reservoir 116.

The thus cleaned layer 100 is then transported into operative engagement with a support material applicator unit 120 and associated reservoir 122, valve 124 and pump 126, which may be similar in construction and operation to units 90, 92, 94 and 96 but provide a support material to fill in those regions in layer 100 from which the unsolidified solidifiable material was removed. Preferably the support material comprises a melted wax, such as Cerita 28-31 from Argueso Corporation of Marmoroneck, N.Y., USA.

Alternatively, the support material may comprise any other suitable material, such as a sinterable material, such as a sinterable wax. Unit 120 provides a generally uniform top surface to layer 100.

Where a melted wax is employed as a support material, the support material applicator unit 120 may comprise a device such as a device identified by Part No. PN-650716 found in SNAH 88 of Nordson Corporation, Atlanta, Ga. Where the support material is instead a sinterable granular material, the support material applicator unit may comprise a device such as a conventional device for dispensing granular materials.

After application of the support material to layer 100, the layer is preferably transported into operative engagement with a solidifying unit 130, typically comprising a plate 132, such as a block of aluminum furnished with internal channels for the passage of a fluid in communication with a fluid supply 134, such as a Model Coolflow CFT-33 commercially available from NES-LAB Instruments Inc., Portsmouth, N.H., USA. Plate 132 is positioned as desired by a positioning mechanism 136. The support material in layer 100 is solidified by intimate contact with plate 132 in order to solidify it as quickly as possible prior to further processing, as will be described hereinbelow. A wax is employed as a support material, the solidifying unit 130 is operative to cool the wax. In this case, a coolant is supplied by fluid supply 134 through the internal channels of the plate 132. Where the support material is instead a sintered material, the solidifying unit 130 may be operative to heat the sintered material, thereby hardening it. In this case, a heated fluid is supplied by fluid supply 134 through the internal channels of plate 132.

Following solidification of the support material in layer 100, the layer is transported into operative engagement with a machining unit 140, typically comprising a conventional multi-blade fly cutter 142 driven by a motor 144 and associated with a dust collection hood 146 and vacuum cleaner 148. Machining unit 140 is operative to trim the top surface of layer 100 to a precise, flat uniform thickness by removing, as appropriate, excessive thicknesses of both the solidified solidifiable material and the solidified support material.

It will be appreciated that the operation of the system for a single layer as described above is repeated multiple times, as the support surface 84 is lowered correspondingly, producing a multilayer built up model having precisely controlled dimensions.

In accordance with an embodiment of the present invention, a problem of undesired shrinkage of the solidified solidifiable material may be dealt with. According to one embodiment of the present invention, the problem of undesired shrinkage may be overcome by using a multiple step irradiation technique, wherein an initial partial irradiation of each layer through the mask takes place, leaving a partially cured layer. Unsolidified portions of the layer are then removed, as by the method detailed above.

Following the removal of the unsolidified portions of the layer, a second irradiation step takes place. Subsequent irradiation and curing cycles may also take place as desired. The second and any subsequent irradiation steps preferably serve to harden the layer. Ideally, the transparent substrate bearing the mask is not used during the second and subsequent irradiation steps.

Figure 2:
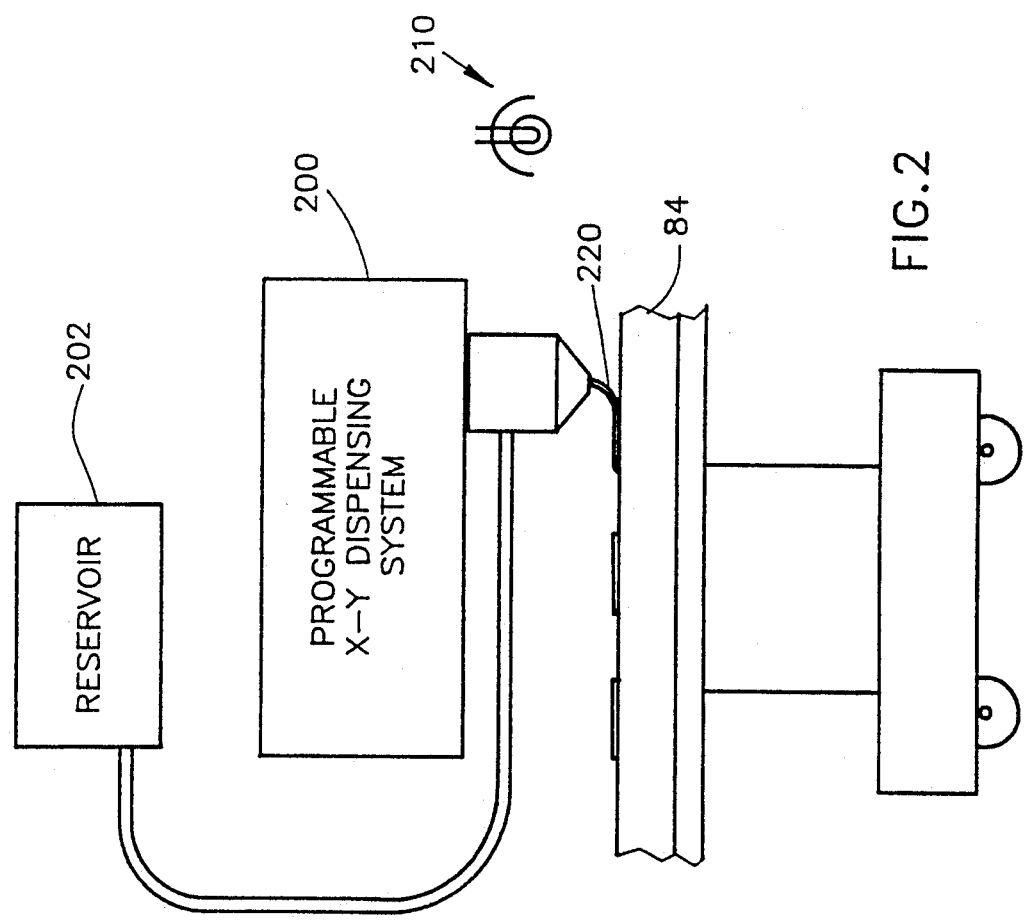
FIG. 2 is a generalized illustration of part of the system of FIG. 1 in accordance with one preferred embodiment of the invention.

Reference is now made to FIG. 2, which illustrates a preferred embodiment of a portion of a physical model producing subsystem constructed and operative in accordance with a preferred embodiment of the present invention. The apparatus of FIG. 2 may replace exposure unit 80, applicator 90 and their associated elements.

The subsystem illustrated in FIG. 2 is particularly characterized in that it may operate without the use of a mask or alternatively only with a mask defining a grid. Where no mask is used, no mask producing subsystem need be provided.

The subsystem of FIG. 2 comprises a programmable X-Y viscous fluid dispensing system 200, such as a Automove 400 Series model 403A gantry configuration from Asymtek of Vista, Calif. Preferably, dispensing system 200 receives a supply of a hardenable substance, such as the radiation solidifiable material mentioned above, from a hardenable substance reservoir 202.

Preferably, the radiation solidifiable material is mixed with a thixotropic material, such as Bentone SD-2 from NL Chemicals, Inc., Hightstown, N.J., USA; or Aerosil fumed silica from Degussa AG of Frankfurt, Germany, prior to dispensing thereof.

The fluid dispensing system 200 is preferably arranged to provide selective dispensing of the hardenable substance in a layer-by-layer fashion on a base, such as movable support surface 84, to define a predetermined layer pattern. A hardening unit 210, typically comprising a UV source, such as a Model AEL 1B, manufactured by Fusion UV Curing Systems of Rockville, Md., USA, is arranged in operational engagement with the layers 220 as they are built up on base 84 for producing hardening of each layer on a layer-by-layer basis, before each subsequent layer of hardenable substance is formed thereover.

Following formation and hardening of each layer 220, the layer may be brought into operative engagement with a support material applicator unit 120 (FIG. 1), for providing support material at locations of each layer which are not filled by the hardenable substance, prior to deposition onto the layer of a succeeding layer of the hardenable substance. The remainder of the apparatus and technique for building a model employing the apparatus of FIG. 2 is similar to that described above in connection with FIG. 1.

The above described system offers the advantage of allowing use of hardenable substances with different properties or viscosities during the building of one model, by simple replacement of the radiation solidifiable material.

Reference is now made to FIG. 3, which illustrates a alternative embodiment of a portion of a physical model producing subsystem. This subsystem replaces exposure unit 80 and employs a different base and base positioning arrangement. It also obviates the need for a fluid strip generator 110, the support material applicator unit 120, the solidifying unit 130 and the machining unit 140.

The subsystem of FIG. 3 is particularly characterized in that it operates without the use of a mask and thus mask producing subsystem 52 may be eliminated.

The system of FIG. 3 comprises an exposing unit 250 comprising a source of high power illumination 254, such as a Mercury light of type AEL 1B that is available from Fusion System Corporation of Rockville, Md., USA, which preferably emits a relatively broad collimated beam 255, a shutter 256 for the high power beam, and a set of deflection mirrors 258 for the high power beam.

Preferably, a high power beam 255 emitted by the power source 254 passes through the shutter 256 and is deflected by the mirrors 258 to a modeling unit 260.

The exposing unit 250 also comprises a source 261 for a relatively narrow laser beam 262. The source 261 may be a commercially available 15 mW helium cadmium laser. The exposing unit 250 further includes a standard shutter 263, and an additional set of deflection mirrors 264 of the type described above.

Preferably, the laser beam 262 emitted from the source 261 passes through the shutter 263 and is deflected by the deflection mirrors 264 to the modeling unit 260. The high power relatively broad collimated beam 255, emitted by power source 254, is characterized by the relatively large illumination coverage it provides. The narrow beam is characterized by the precision of the beam.

The modeling unit 260 comprises a vat 266 containing a solidifiable liquid 268. The solidifiable liquid may be any suitable radiation solidifiable material, such as Ciba-tool 5L XB 5081 from Ciba-Geigy Corporation of Basel, Switzerland.

Submerged in the vat is a level surface 270 that can be moved along the Z-axis. This surface may serve as a base for a three-dimensional model 272. Movement of the tray in the Z direction may be controlled by a vertical positioning subsystem 274. The exposing unit 250 and the modeling unit 260 are operated in response to data received from a suitable data source such as a CAD source.

When the source 261 for the narrow beam 262 is activated, the narrow beam 262 exposes a narrow portion of the solidifiable liquid 268. When the source 254 for the high power beam 255 is activated, the relatively broad beam 255 exposes a broad area of the solidifiable liquid 268. Exposure of the solidifiable liquid causes hardening of the solidifiable liquid at the specific location where the exposure occurs.

Upon completion of hardening of a given layer, the vertical tray positioning subsystem 274 is operated to lower the tray 270 in order to permit exposure of a further layer thereover.

Reference is now made to FIGS. 4A–4E which illustrate various stages in the operation of the apparatus illustrated in FIG. 3 in accordance with the present invention. Large interior sections of an image are hardened by exposure to the relatively large, collimated light beam that is depicted in FIG. 3. Peripheral sections, which require greater precision, are hardened by impingement thereon of the narrow laser beam.

Figure 4E:
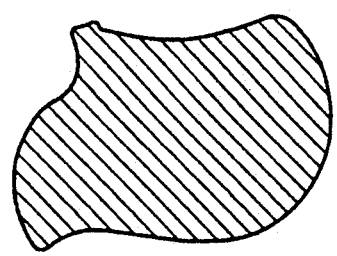
FIGS. 4A, 4B, 4C, 4D and 4E illustrate various stages in the operation of the apparatus of FIG. 3.
Figure 4D:
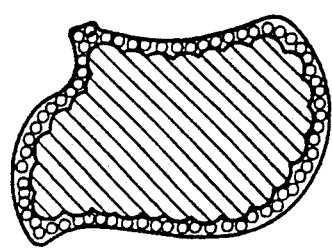
Figure 4C:
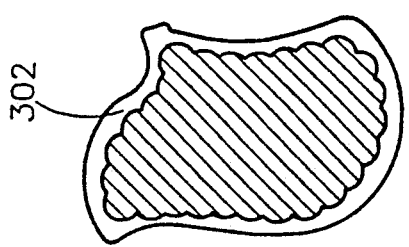
Figure 4B:
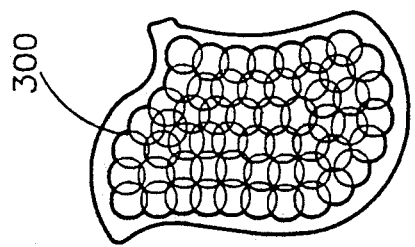
Figure 4A:
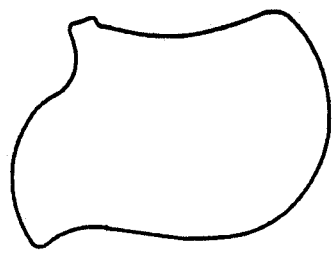

FIG. 4A illustrates a typical image that is to be hardened. FIG. 4B illustrates the inner areas 300 of the image which are preferably hardened by activation of the source 254 of the relatively broad high powered collimated beam 255. A certain amount of unsolidified material, within the boundaries of the image, remains, as indicated by reference numeral 302 in FIG. 4C, which illustrates the image of FIG. 4A after the hardening of the inner areas. The unsolidified material 302 adjacent to the edges of the image is not hardened by operation of the source 254 of the high powered relatively broad beam 255.

FIG. 4D illustrates the hardening of previously unsolidified material 302 at the outer areas of the image by activation of the source 261 of the narrow laser beam 262. FIG. 4E depicts a fully hardened image.

The hardening of the solidifiable material at the exterior and interior areas may be performed simultaneously. Alternatively, the hardening at the interior areas may be performed prior to the hardening at the exterior areas.

The above described steps of operation offer the advantage of reducing the time necessary to harden a layer of material. The method of hardening at the inner areas and subsequently hardening at outer areas provides improved dimensional accuracy of the image being formed by reduction of the uncontrollable hardening deformations that may occur after exposure.

Figure 5:
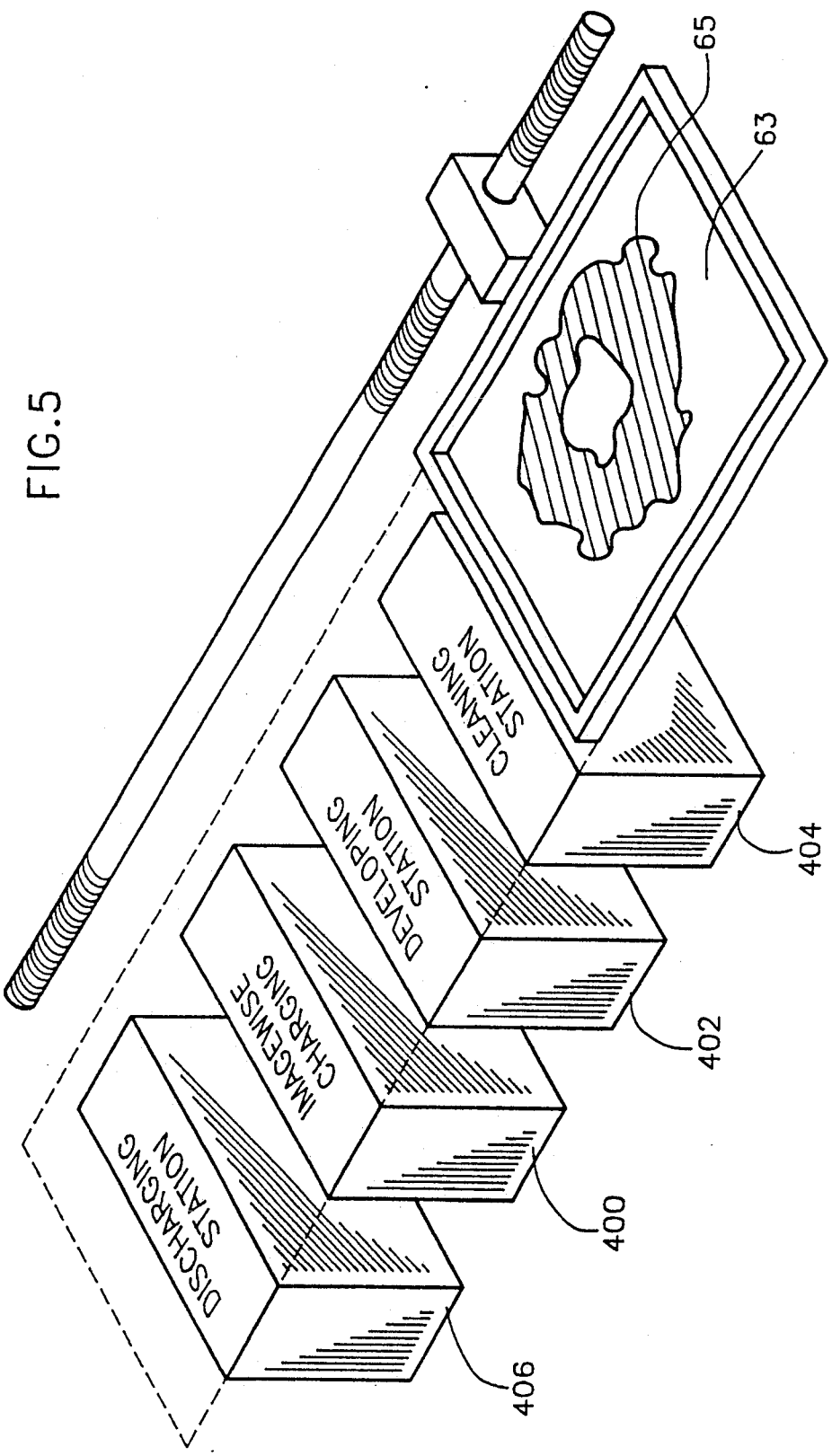
FIG. 5 is a generalized illustration of mask generating apparatus forming part of the system of FIG. 1 in accordance with still another preferred embodiment of the invention.

Reference is now made to FIG. 5 which illustrates in functional terms a preferred embodiment of a mask producing subsystem 52 (FIG. 1). As seen in FIG. 5, a mask 65 is typically formed on a glass substrate 63 by imagewise charging apparatus 400, such as ionographic imaging apparatus 56 (FIG. 1). The mask is then developed at a developing station 402, such as a developing unit 68 (FIG. 1). After use of the mask, the substrate 63 is brought into operative engagement with a cleaning station 404, such as cleaning and toner removal apparatus 70 (FIG. 1) and is subsequently discharged at a discharging station 406, such as corona discharge device 73 (FIG. 1).

Figure 6:
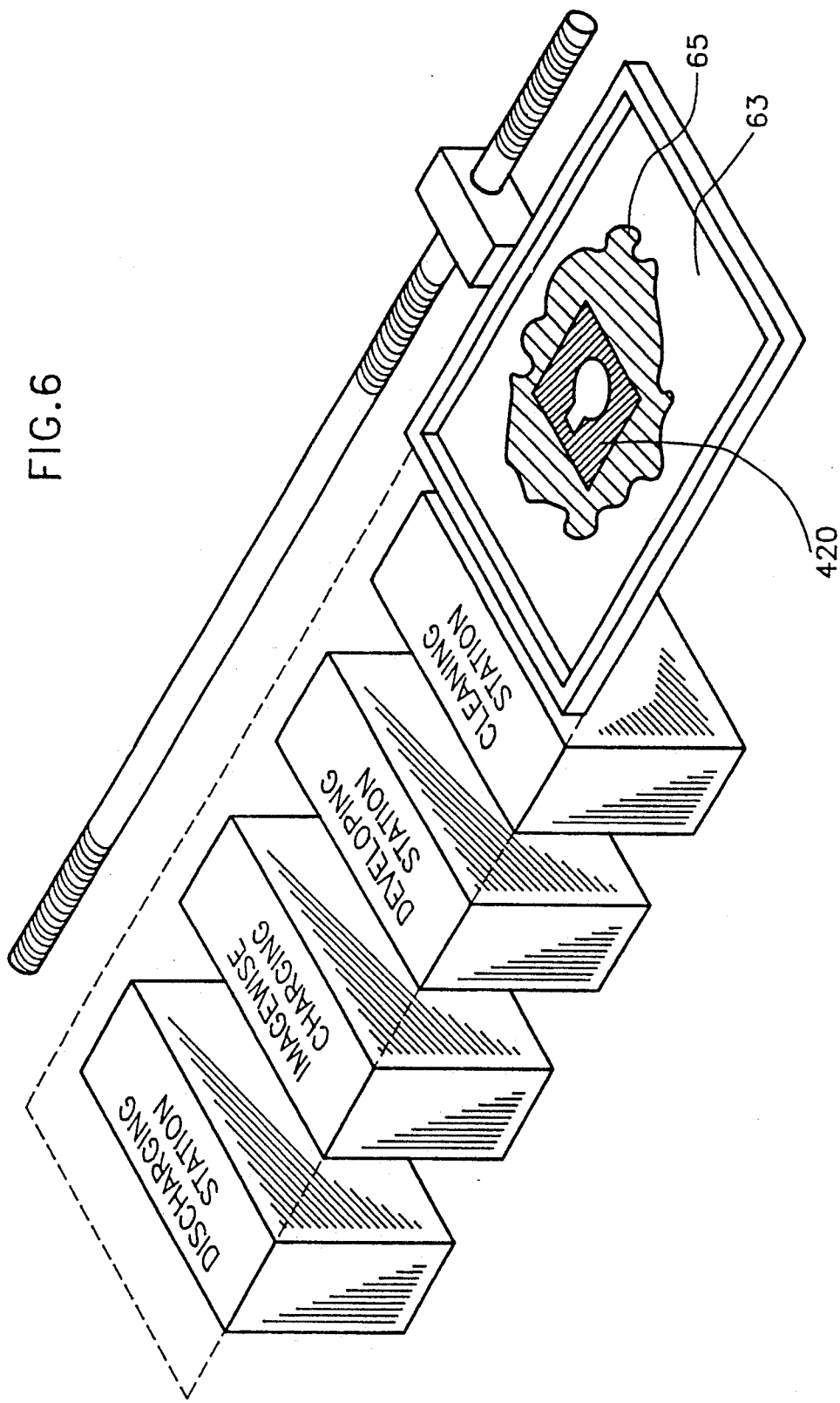
FIG. 6 is a generalized illustration of an alternate embodiment of the apparatus of FIG. 5 in accordance with yet another preferred embodiment of the invention.

Reference is now made to FIG. 6 which illustrates an alternative embodiment of the mask producing subsystem of FIG. 5. According to this embodiment, a segment of film 420 is superimposed on the mask 65 of the substrate 63. Preferably, the film is superimposed on the top surface of the transparent substrate 63 such that at least part of the film is located over a portion of the transparent substrate 63 which is clear of toner therebelow.

The film segment 420, which may be of type LPF7 from Eastman-Kodak Corporation, Rochester, N.Y., USA, typically contains a non-erasable relatively high resolution image. The image on the film may be generated by a high quality plotter, for example, the Raystar plotter from Scitex Corporation Ltd. of Herzlia, Israel.

Figure 7:
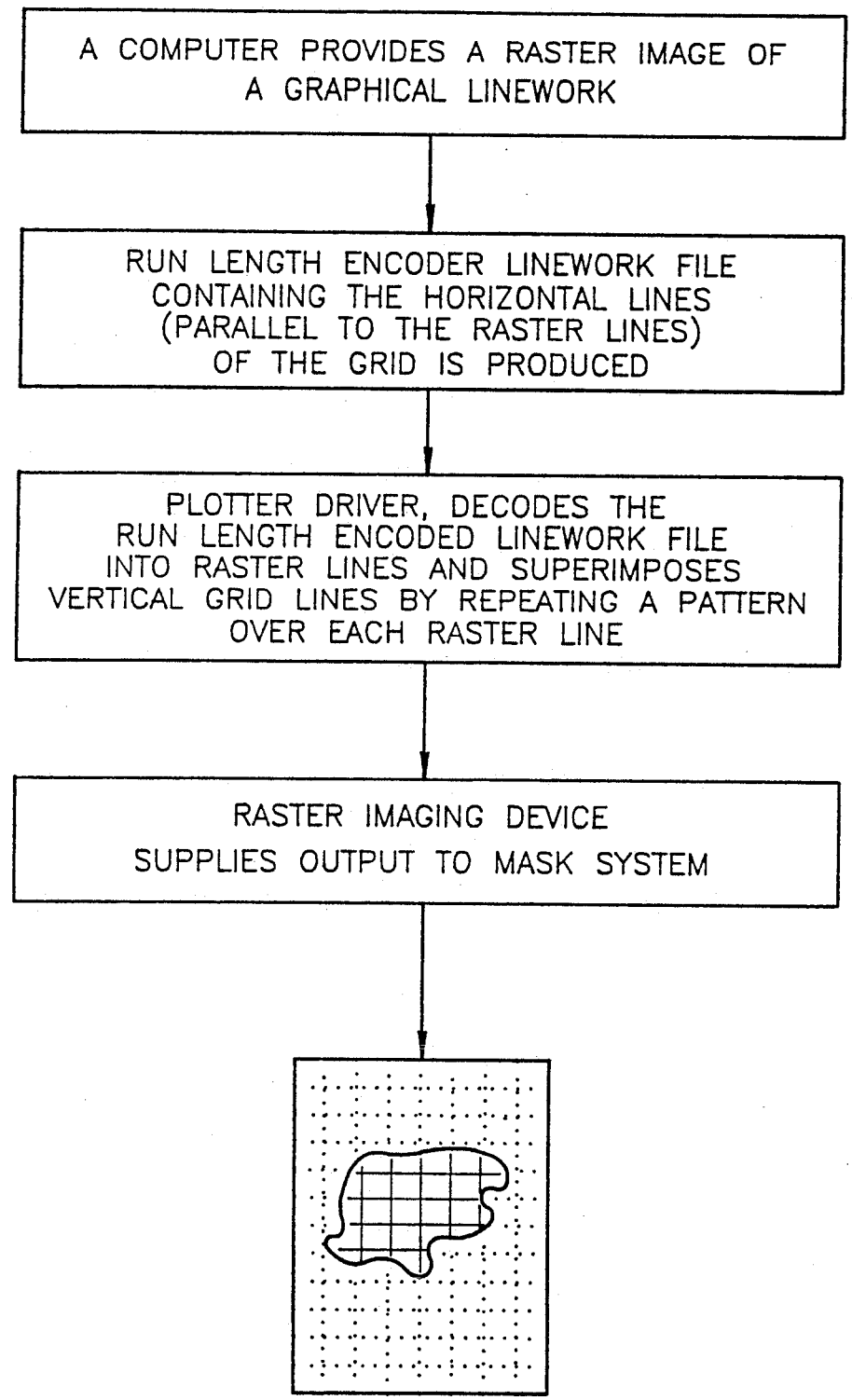
FIG. 7 is a flow chart illustrating the steps in the generation of a grid pattern superimposed on layers of an object.

Reference is now made to FIG. 7 which contains a flow chart which illustrates the steps in the generation of a grid pattern superimposed on layers of an object. The grid pattern is useful for shrinkage control in that it provides solidification of solidifiable material in discrete spaced uniform relatively small areas which are thus relatively immune to significant shrinkage stresses.

Alternatively, the grid pattern may be generated only on the interior of the object.

The grid pattern is generated by a computer which provides a raster image of graphical line work. Data processing subsystem 55 (FIG. 1) produces a run-length encoded linework file containing the horizontal lines of the grid, which are parallel to the raster lines of the grid. A plotter driver, which may also be included in subsystem 55, decodes the run-length encoded linework file into raster lines and superimposes vertical grid lines by repeating a pattern over each raster line.

The output of the plotter driver is supplied to the mask subsystem 52, which constitutes a raster imaging device. The mask subsystem 52 produces a mask 65.

Figure 8:
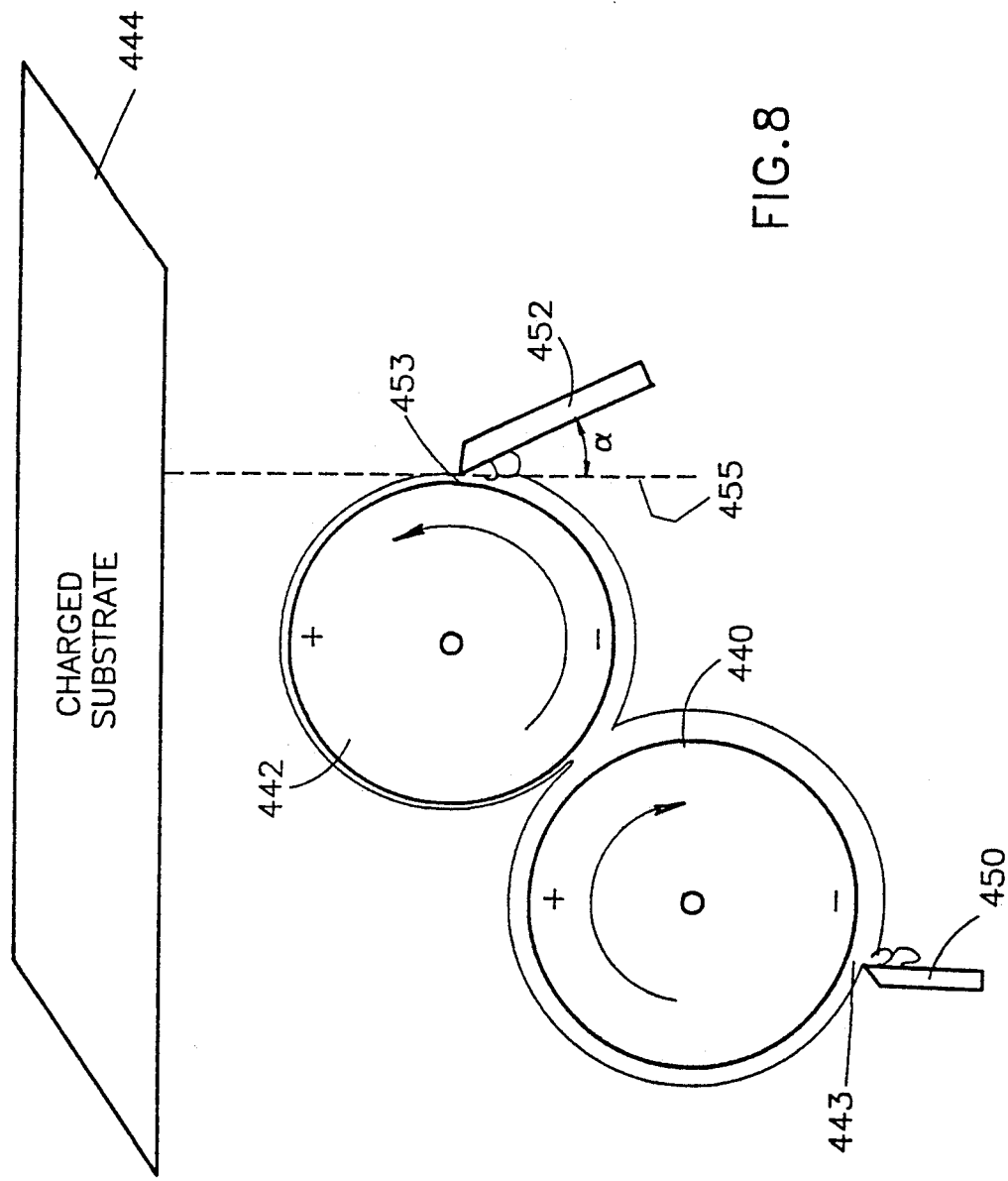
FIG. 8 is an illustration of a portion of developing apparatus forming part of the apparatus of FIG. 5.

Reference is now made to FIG. 8 which illustrates a portion of the developing station 402 of FIG. 5, which corresponds to part of the developing unit 68 of FIG. 1. FIG. 8 illustrates a system for toner transport comprising a first magnetic roller 440, which may receive toner from a container directly.

The first magnetic roller, such as a standard magnetic roller from Hitachi Metals Ltd. of Tokyo, Japan, preferably rotates at a high revolution speed, such as 300 RPM, in a first direction, typically clockwise, transporting a constant stream of toner to a second magnetic roller 442.

The second magnetic roller 442, which is illustrated rotating in a counter-clockwise direction, is preferably partially covered by a uniform layer of toner, typically of thickness 0.7 mm, which is supplied by the first magnetic roller 440.

The second magnetic roller 442 serves as a development roller and spreads an even layer of toner onto a charged substrate 444. Preferably, the second magnetic roller 442, which may be a standard development roller, rotates at a lower speed than the first roller 440.

A first blade 450 is associated with the first magnetic roller 440 and is preferably positioned so that a relatively small gap 443, typically 0.5 mm, is defined between the blade 450 and the first magnetic roller 440. The first blade 450, which may be a doctor blade, typically made of aluminum, prevents large aggregations of toner from being carried from the first magnetic roller 440 to the second magnetic roller 442.

A second blade 452, preferably a doctor blade, is associated with the second magnetic roller and is preferably positioned so that a gap 453 is defined between the blade 452 and the second roller 442, which gap is larger than gap 443. A typical value for the gap 453 is 0.7 mm.

The positioning of the second blade 452 is characterized by a relatively small angle alpha between a tangent 455 to the second magnetic roller 442 and the edge of the blade 452. The second blade 452 is operative to trap aggregations of toners. Due to the small angle alpha between the second blade 452 and the second magnetic roller 442, hydrodynamic pressure is created. This pressure cracks aggregations of toner and ensures a uniform layer of toner on the second magnetic roller 442.

Reference is now made to FIG. 9 which illustrates a preferred embodiment of a portion of the cleaning station 404 of FIG. 5, which corresponds to the cleaning and toner removal apparatus 70 of FIG. 1.

FIG. 9 illustrates a system for cleaning and toner removal comprising a magnetic roller 460, which is operative to remove toner from a brush 464. A preferably thin magnetic scraper 462 is aligned in touching contact with roller 460 along its length. The magnetic scraper 462, which serves to clear the roller 460 of toner, is magnetically attracted to roller 460 so as to preferably apply generally consistent and uniform pressure at each contact location between the scraper 462 and the roller 460.

Figure 10:
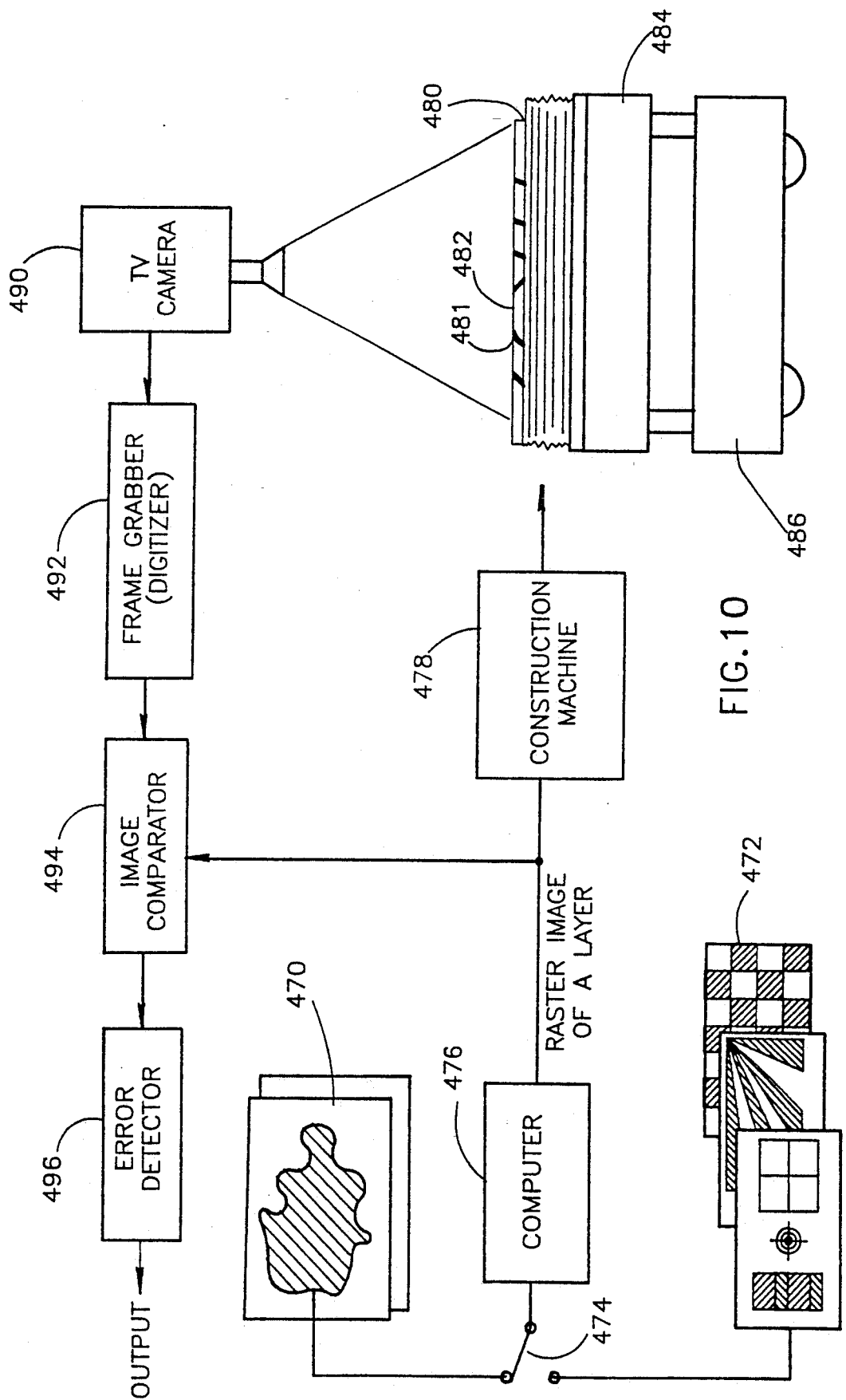
FIG. 10 is an illustration of apparatus for the generation, examination and elimination of a model having a diagnostic layer.

Reference is now made to FIG. 10 which illustrates diagnostic layer analysis apparatus that may be incorporated into the three dimensional modeling system of FIG. 1. The apparatus of FIG. 10 includes a first source of data 470, describing images that are typically layers of a three dimensional model; a second source of data 472, for example a CAD database, describing images which are typically graphical patterns useful as diagnostic layers; and selection means 474 for alternating between the data sources.

An image from the first source of data 470 or alternatively, an image from the second source of data 472 is selected in accordance with an algorithm described below and is used by a computer 476 to produce a raster image from the selected image. A raster image of the selected image is provided from the computer 476 to the image comparator 494.

The raster image of the selected image is also transmitted from the computer 476 to a construction machine 478. The construction machine 478 corresponds to the portion of the system for producing three dimensional models 50 of FIG. 1.

A layer 480 may be constructed on a support surface 484 which corresponds to support surface 84 (FIG. 1) in accordance with any of the layer building techniques described above. Following construction of each layer, the constructed layer 480 contains a physical representation of the image described by the first data source 470 or alternatively, by the second data source 472.

The constructed layer 480 typically includes portions containing hardened radiation solidifiable material 481 which correspond to the selected image and portions containing hardened support material 482. The visual contrast between the shades of the two materials can be detected by a television camera 490.

The television camera 490 typically photographs the constructed layer 480 and supplies the photographed image to a frame grabber 492, available as part of the Optrotech Vision 106 package from Optrotech of Nes Ziona, Israel which digitizes the photographed image and converts it to raster format. The raster image is then transmitted to an image comparator 494. The image comparator 494, available as part of the Optrotech Vision 106 package from Optrotech of Nes Ziona, Israel, compares the raster image of the selected image that was generated by the computer 476 with the raster image of the constructed layer 480 generated by the frame grabber 492.

The results of the comparison from the comparator 494 are sent to an error detector 496, available as part of the Optrotech Vision 106 package from Optrotech of Nes Ziona, Israel, to determine if any discrepancies exist between the raster image of the original selected image and the raster image of the constructed layer. If such discrepancies exist, the error detector 496 determines whether or not the discrepancies represent an actual error in the generation of the construction layer.

Elimination of a flawed construction layer may be carried out by a command from the computer 476. Such command can be input manually. Elimination of a layer occurs by returning the layer 480 to the construction machine 478. The base 484 is raised the thickness of one layer and moved into operative engagement with the milling unit 140 (FIG. 1). Multiple layers can be removed by repeating the steps described above.

According to an alternate embodiment of the invention, visual inspection carried out by a human inspector can replace the television camera 490, thus obviating the need for the frame grabber 492, the image comparator 494, and the error detector 496.

Figure 11:
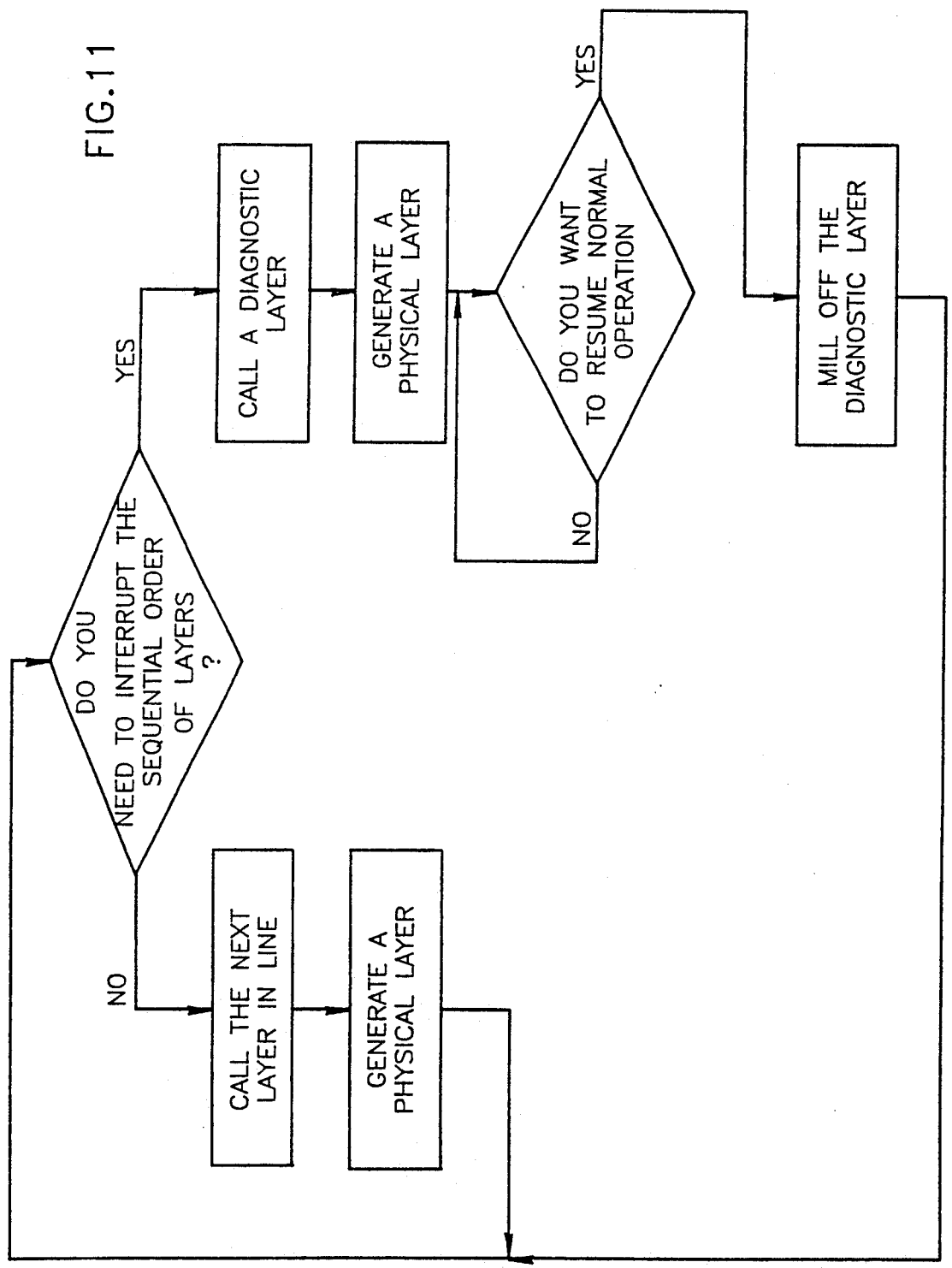
FIG. 11 is a flowchart illustration of techniques for generation, examination and elimination of the diagnostic layer in accordance with a preferred embodiment of the invention.

Reference is now made to FIG. 11 which contains a flowchart illustration of techniques for generation, examination and elimination of a constructed layer as illustrated by the apparatus of FIG. 10 in accordance with an embodiment of the present invention.

FIG. 11 contains a flow chart that depicts the algorithm which controls the switching means 474 that is described in FIG. 10. The steps of determining which data source to use may include the following sequence of operative steps.

The operator, or an automatic operating program decides whether to interrupt the existing sequential order of ordinary layers. Unless and until a decision is made to interrupt the existing sequential order of ordinary layers, the sequence will continue, including the steps of calling the next layer in line and generating a physical layer.

If an instruction to interrupt the sequential order of layers is given, a diagnostic layer is called from the second data source 472 and a physical diagnostic layer is generated. A decision is made by an operator or by an automatic operating program on the basis of examination of the diagnostic layer and/or comparison thereof with a reference by means of comparator 494 and error detector 496 whether to resume normal operation of the system. If yes, the diagnostic layer is milled off and normal operation is resumed.

Figure 12:
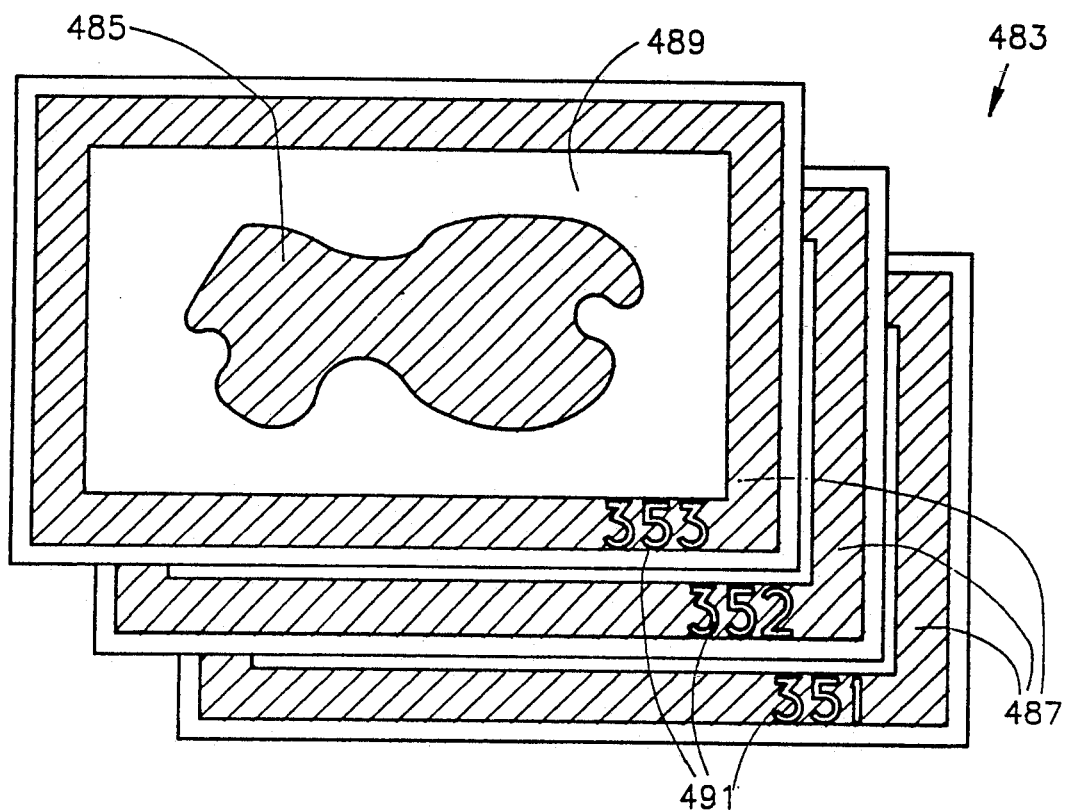
FIG. 12 is an illustration of the numbering of each layer in accordance with a preferred embodiment of the invention.

Reference is now made to FIG. 12 which illustrates numbering of the layers of a three dimensional model in accordance with an embodiment of the present invention. The illustrated numbering may be provided by means of data processing subsystem 55 (FIG. 1). FIG. 12 illustrates several typical layers 483 which contain hardened radiation solidifiable material 485, as of a type described above, forming part of a three dimensional model; additional hardened radiation solidifiable material 487, as of a type described above, forming a frame; hardened support material 489 as of a type described above; and additional hardened support material 491 offering visually sensible information identifying the layers.

Figure 13:
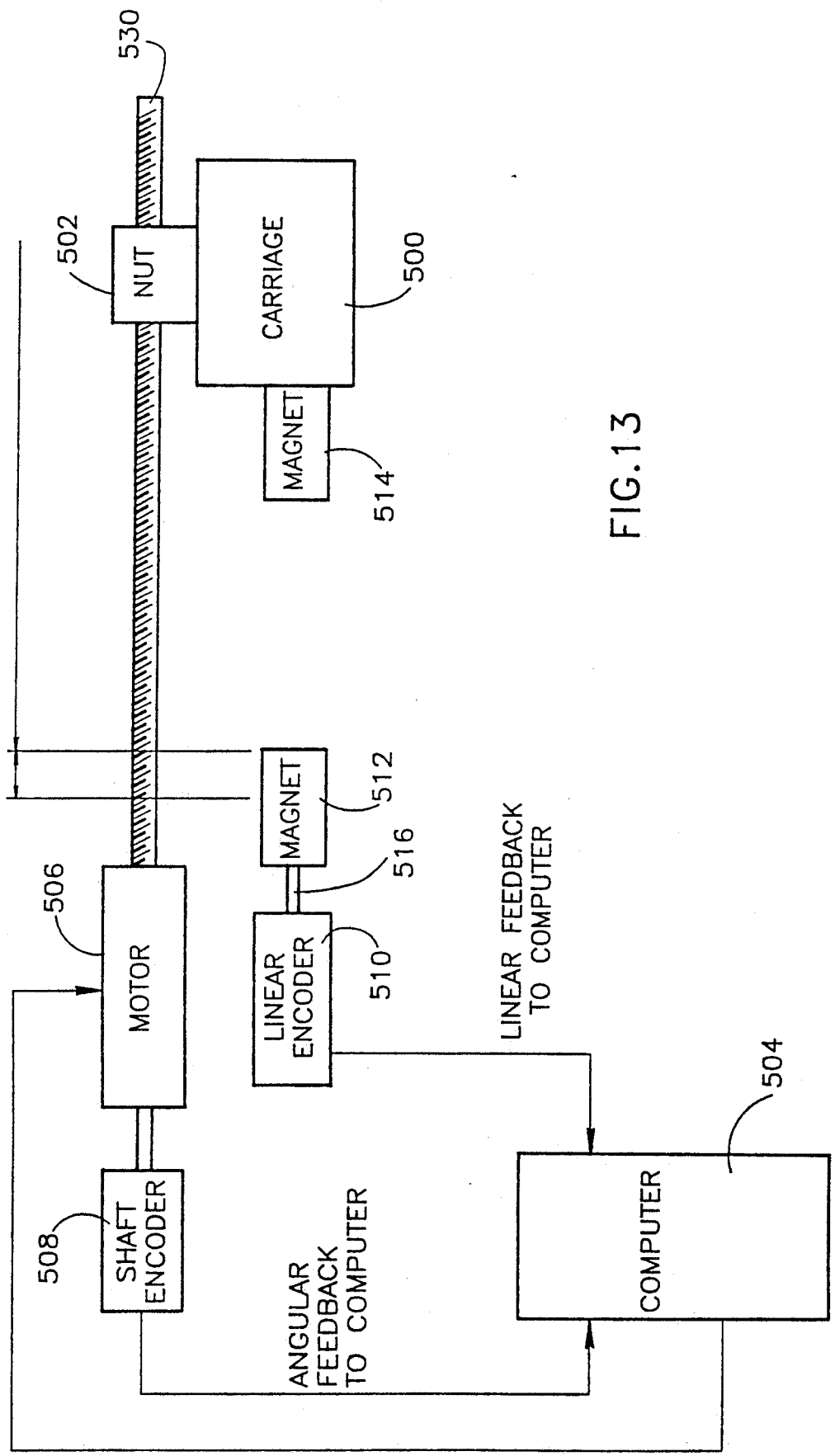
FIG. 13 is an illustration of a linear encoder forming part of the apparatus of FIG. 1 in accordance with a preferred embodiment of the invention.

Reference is now made to FIG. 13 which illustrates a linear motion control subsystem which may form part of the apparatus of FIG. 1 in accordance with a preferred embodiment of the invention. The subsystem of FIG. 13 comprises a computer 504, which provides control inputs to a motor 506. The motor 506 is operative to provide travel of a carriage 500, such as carriage 64 in FIG. 1, along a linear guide 530, such as linear guide 66 in FIG. 1. The carriage 500 is retained on the linear guide 530 by a nut 502.

The subsystem further comprises a shaft encoder 508 which is associated with the output shaft of the motor 506. Angular feedback from the shaft encoder 508 to the computer 504 provides a rough indication of the location of the carriage 500 along the linear guide 530. The output indication of the carriage location provided by the shaft encoder 508 is typically accurate to +/−250 microns.

Also included in the subsystem is a linear encoder 510 associated with a magnet 512, which is movable along track 516. A second magnet 514 is preferably associated with carriage 500. The linear encoder 510 is operational when magnet 512 is in touching contact with magnet 514.

Alternately, the second magnet 514 may be replaced by a body of a ferrous metal.

When operational, the linear encoder 510 provides the computer 504 with linear feedback offering a relatively precise output indication of the location of the carriage 500 along the linear guide 530. Typically, the output indication provided by the linear encoder 510 is accurate to +/−1 micron. Preferably, angular feedback from the shaft encoder 508 is used by the computer when the carriage 500 is not in the linear encoder operational range.

The subsystem of FIG. 13 offers the advantage of precise linear motion control over a relatively small range where accuracy is important. Over a relatively larger range where accuracy is less critical, motion control is provided by the less precise, less expensive, shaft encoder.

The above described subsystem offers the advantage of overcoming the known sources of inaccuracy common to long shaft encoders, such as elongation due to temperature and torsion.

Figure 14:
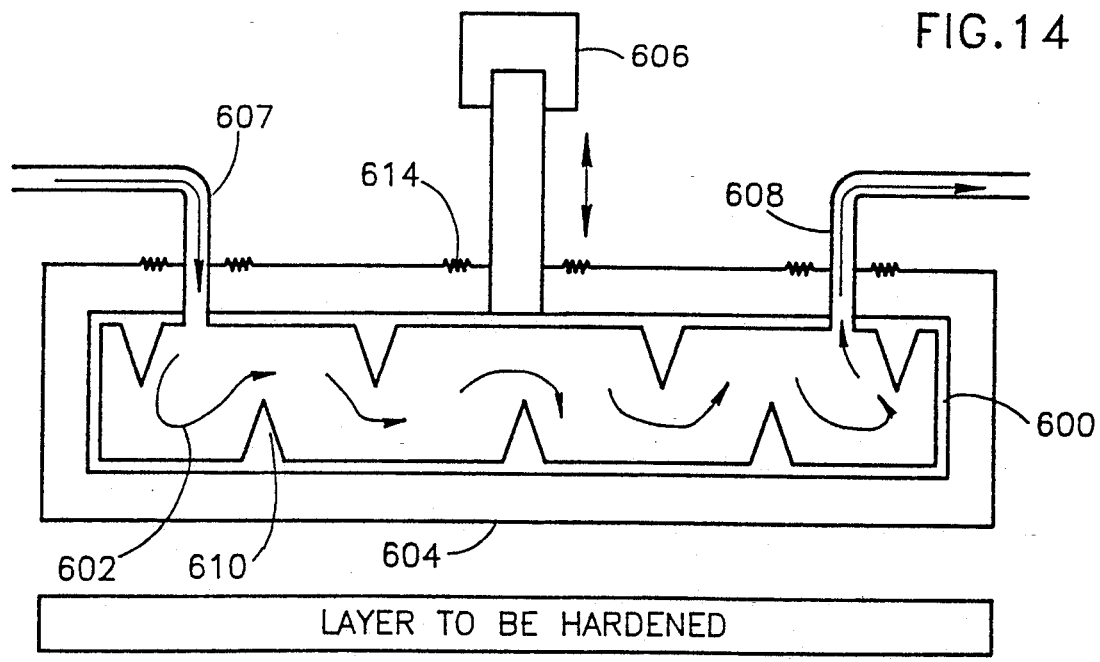
FIG. 14 is an illustration of a support material hardening subsystem forming part of the apparatus of FIG. 1 in accordance with a preferred embodiment of the invention.

Reference is now made to FIG. 14 which illustrates a preferred embodiment of a support material hardening subsystem constructed and operative in accordance with a preferred embodiment of the present invention. The apparatus of FIG. 14 may replace plate 132 in FIG. 1 and its associated elements.

The subsystem illustrated in FIG. 14 is particularly characterized in that it avoids collection of condensate on layers being solidified, during cooling thereof.

FIG. 14 illustrates apparatus for hardening a hardenable material, comprising an inner box 600 through which a fluid 602 flows, an outer box 604 which encases the inner box 600, and a positioning mechanism 606 for raising and lowering the inner box 600 relative to the outer box 604.

Fluid 602 enters the inner box through a fluid inlet 607 and may be drained from the inner box via a fluid outlet 608. Preferably, the fluid 602 is a liquid coolant such as the type mentioned above. The inside of the inner box 600 includes ribs 610 which help circulate the fluid 602 through the inner box 600. The bottom of the inner box is typically flat. Preferably, the inner box contains a relatively high mass of a relatively highly thermal conductive substance, such as aluminum, giving the box relatively high thermal inertia.

The outer box is sealed about fluid inlet and outlet 607 and 608 respectively by flexible closures 614. The outer box preferably contains a relatively low mass of a relatively low thermal conductive substance, such as aluminum, providing the outer box 604 with relatively low thermal inertia.

During cooling operation, fluid 602 enters the inner box 600 through fluid inlet 607, cooling the bottom of the inner box 600. The outer box 604 is cooled through contact with the inner box 600. Placing the outer box 604 in intimate contact with the layer to be hardened cools the layer to be hardened.

According to an alternative implementation of the same embodiment of the present invention, heated fluid is circulated through the inner box 600 instead of cooled fluid. Typically, the heated fluid is water which has been heated to a suitable temperature. The fluid 602 serves to heat the typically flat bottom of the inner box 600. Consequently, the outer box 604 is heated. The apparatus can be used to harden substances that solidify through heat, such as the sinterable oranular material mentioned above.

Placing the outer box 604 in intimate contact with the layer to be hardened heats the layer to be hardened.

It will be appreciated by persons skilled in the art that the present invention is not limited by what has been particularly shown and described hereinabove. Rather, the scope of the present invention is defined only by the claims which follow:

We claim:

1. Apparatus for producing a three-dimensional model comprising:
   means for selective dispensing of a photopolymer materials, layer upon layer, in a pattern matter configuration; and
   means for radiation curing each said photopolymer layer following deposition thereof and prior to deposition thereon of a succeeding layer of photopolymer.

2. Apparatus according to claim 1 and also comprising means for applying a support material at certain locations of each layer which are not filled by photopolymer prior to deposition onto said layer of a succeeding layer of photopolymer.

3. Apparatus according to claim 2 and also comprising machining means for leveling each layer prior to deposition thereon of a succeeding layer of photopolymer.

4. A method for producing a three-dimensional model comprising the steps of:
   selective dispensing of a photopolymer material, layer upon layer, in a pattern configuration; and
   radiation curing each said photopolymer layer following deposition thereof and prior to deposition thereon of a succeeding layer of photopolymer.

5. A method according to claim 4 and also comprising the step of:
   applying a support material at certain locations of each layer which are not filled by photopolymer prior to deposition onto said layer of a succeeding layer of photopolymer.

6. A method according to claim 5 and also comprising the step of:
   mechanically leveling each layer prior to deposition thereon of a succeeding layer of photopolymer.

7. Apparatus for producing a three-dimensional model comprising:
   means for selective dispensing of a photopolymer material layer upon layer, in a pattern configuration; and
   means for radiation curing each photopolymer layer following deposition thereof and prior to deposition thereon of a succeeding layer of photopolymer, and wherein said means for curing includes means for initially curing said layer at interior locations thereof and subsequently curing said layer at peripheral locations thereof.

8. Apparatus according to claim 7 and wherein said means for initially curing comprises:

means for applying a coarse, high power beam of ultraviolet illumination at regions away from edges thereof; and means for subsequently applying a well focussed, low power beam of laser radiation to regions of the layer adjacent the edges.

9. A method for producing a three-dimensional model comprising the steps of:

selective dispensing of a photopolymer material, layer upon layer in a pattern configuration; and radiation curing each said photopolymer layer following deposition thereof and prior to deposition thereon of a succeeding layer of photopolymer, and wherein said step of radiation curing includes the steps of initially curing said layer at interior locations thereof and subsequently curing said layer at exterior locations thereof.

10. A method according to claim 9 and wherein said step of initially curing comprises the steps of:

applying a coarse, high power beam of ultraviolet illumination at regions away from edges of the layer; and subsequently applying a well focussed, low power beam of laser radiation to regions of the layer adjacent the edges.

11. Apparatus for producing a three-dimensional model comprising:

means for selective dispensing of a photopolymer material, layer upon layer; and means for curing each said photopolymer layer following deposition thereof by exposing each layer of the photopolymer material through a mask defining a layered section of an object to be modeled, superimposed upon a grid pattern, and wherein the means for curing includes:

computer means for generating a layer by layer raster pattern parallel to a first axis of each layer, and hardware plotter driver means receiving and decoding said raster pattern to define first grid lines along said first axis and adding thereto second grid lines along a second axis, thereby to define said grid pattern.

12. Apparatus for producing a grid pattern comprising;

computer means for selective dispensing of a photopolymer material, layer by layer in a raster pattern parallel to a first axis; and hardware plotter driver means receiving and decoding said raster pattern to define first grid lines along said first axis and adding thereto second grid lines along a second axis, thereby to define said grid pattern.

13. A method for producing a three-dimensional model comprising;

selective dispensing of a photopolymer material, layer upon layer; and curing each said photopolymer layer following deposition thereof by exposing each layer of the photopolymer material through a mask defining a layered section of an object to be modeled superimposed upon a grid comprising first grid lines, and wherein the step of curing includes the steps of:

computer generating a layer by layer raster pattern parallel to a first axis of each layer, and receiving the raster pattern to define the first grid lines along the first axis and adding thereto second grid lines along a second axis, thereby to define a grid pattern.

14. A method according to claim 13 and wherein said grid pattern lies only interior of the model.

15. A method according to claim 14 and wherein said grid pattern is spaced from the exterior of the model by at least a predetermined thickness.

16. Apparatus for producing a three-dimensional model comprising:

means for selective dispensing of a photopolymer material, layer upon layer;

means for exposing the photopolymer material to define selectable configuration; and means for curing the exposed portion of each photopolymer layer following deposition thereof and prior to deposition thereon of a succeeding layer of photopolymer, and wherein said means for exposing comprises means for directing illumination through a mask including a low resolution, programmable erasable portion associated with a high resolution non-erasable film portion.

17. A method for producing a three-dimensional model comprising;

selective dispensing of a photopolymer material, layer upon layer;

exposing the photopolymer material to define a pattern configuration; and curing the exposed portion of each photopolymer layer following deposition thereof and prior to deposition thereon of a succeeding layer of photopolymer, and wherein said step of exposing comprises the step of directing illumination through a mask including a low resolution, programmable erasable portion associated with a high resolution non-erasable film portion.

18. Apparatus for producing a three-dimensional model comprising:

means for depositing, layer upon layer, a photopolymer material;

means for radiation curing each said photopolymer layer following deposition thereof and prior to deposition thereon of a succeeding layer of photopolymer, wherein said means for depositing includes means for selectably forming a diagnostic layer;

mean for analyzing the diagnostic layer; and means for removing the diagnostic layer before subsequent deposition of other layers.

19. A method for producing a three-dimensional model comprising the steps of;

depositing, layer upon layer, a photopolymer material;

curing each photopolymer layer following deposition thereof and prior to deposition thereon of a succeeding layer of photopolymer, and wherein said step of depositing includes the step of selectably forming a diagnostic layer;

analyzing the diagnostic layer; and removing the diagnostic layer before subsequent deposition of other layers.

20. Apparatus for producing a three-dimensional model comprising;

means for selective dispensing of a photopolymer material, layer upon layer in a pattern configuration;

means for curing each said photopolymer layer following deposition thereof and prior to deposition thereon of a succeeding layer of photopolymer; and optical inspection means for visually inspecting each layer as said layer is formed.

21. Apparatus according to claim 20 and also comprising:

means for exposing the photopolymer material through a mask to define selectable configuration and wherein said optical inspection means comprises means for inspecting said mask.

22. A method for producing a three-dimensional model comprising:

selective dispensing of a photopolymer material, layer upon layer in a pattern configuration;

curing each photopolymer layer following deposition thereof and prior to deposition thereon of a succeeding layer of photopolymer; and optically inspecting each layer as said layer is formed.

23. A method according to claim 22 and also comprising the step of:

exposing the photopolymer material through a mask to define selectable configuration and wherein the optical inspection step comprises inspecting said mask.

24. Apparatus for producing a three-dimensional model comprising;

means for selective dispensing a photopolymer material, layer upon layer in a pattern configuration; and means for radiation curing each said photopolymer layer following deposition thereof and prior to deposition thereon of a succeeding layer of photopolymer, and wherein said means for radiation curing includes:

means for initially partially curing the photopolymer layer to provide a partially cured photopolymer layer, means for removing uncured material from the partially cured photopolymer layer, and means for thereafter finally curing the photopolymer layer.

25. A method for producing a three-dimensional model comprising the steps of;

selective dispensing a photopolymer material, layer upon layer, in a pattern configuration; and radiation curing each said photopolymer layer following deposition thereof and prior to deposition thereon of a succeeding layer of photopolymer, and wherein said step of radiation curing includes the steps of:

initially partially curing the photopolymer layer to provide a partially cured photopolymer layer, removing uncured material from the partially cured photopolymer layer, and thereafter finally curing the photopolymer layer.

26. Apparatus for producing a three-dimensional model comprising;

means for selective dispensing of a photopolymer material, layer upon layer in a pattern configuration;

means for radiation curing each said photopolymer layer following deposition thereof and prior to deposition thereon of a succeeding layer of photopolymer; and means for providing a visually sensible indication on each layer.

27. A method for producing a three-dimensional model comprising the steps of:

selective dispensing of a photopolymer material, layer upon layer in a pattern configuration;

radiation curing each said photopolymer layer following deposition thereof and prior to deposition thereon of a succeeding layer of photopolymer; and providing a visually sensible indication on each layer.

28. Apparatus for producing a three-dimensional model comprising;

means for selective dispensing of a photopolymer material, layer upon layer in a pattern configuration;

means for radiation curing each said photopolymer layer following deposition thereof and prior to deposition thereon of a succeeding layer of photopolymer;

means for applying a support material at certain locations of each layer which are not filled by photopolymer prior to deposition onto said layer of a succeeding layer of photopolymer, wherein said support material is a solidifiable material; and cooling plate means arranged for planar engagement with the layer after application of said support material, for cooling and thus solidifying the solidifiable material.

29. Apparatus according to claim 26 and wherein said solidifying plate means includes an outer, passive contact plate portion having a low thermal inertia and an inner, active plate portion having a high thermal inertia.

30. Apparatus for producing a three-dimensional model comprising;

means for selective dispensing of a photopolymer material, layer upon layer in a pattern configuration;

means for radiation curing each said photopolymer layer following deposition thereof and prior to deposition thereon of a succeeding layer of photopolymer; and means for applying a support material at certain locations of each layer which are not filled by photopolymer prior to deposition onto said layer of a succeeding layer of photopolymer, wherein said support material is a sintered powder.

* * * * *